Sept. 8, 1964   R. F. BLAKE ET AL   3,148,323
CONTROLLED FREQUENCY POWER SUPPLY SYSTEM
Filed July 6, 1959   2 Sheets-Sheet 1
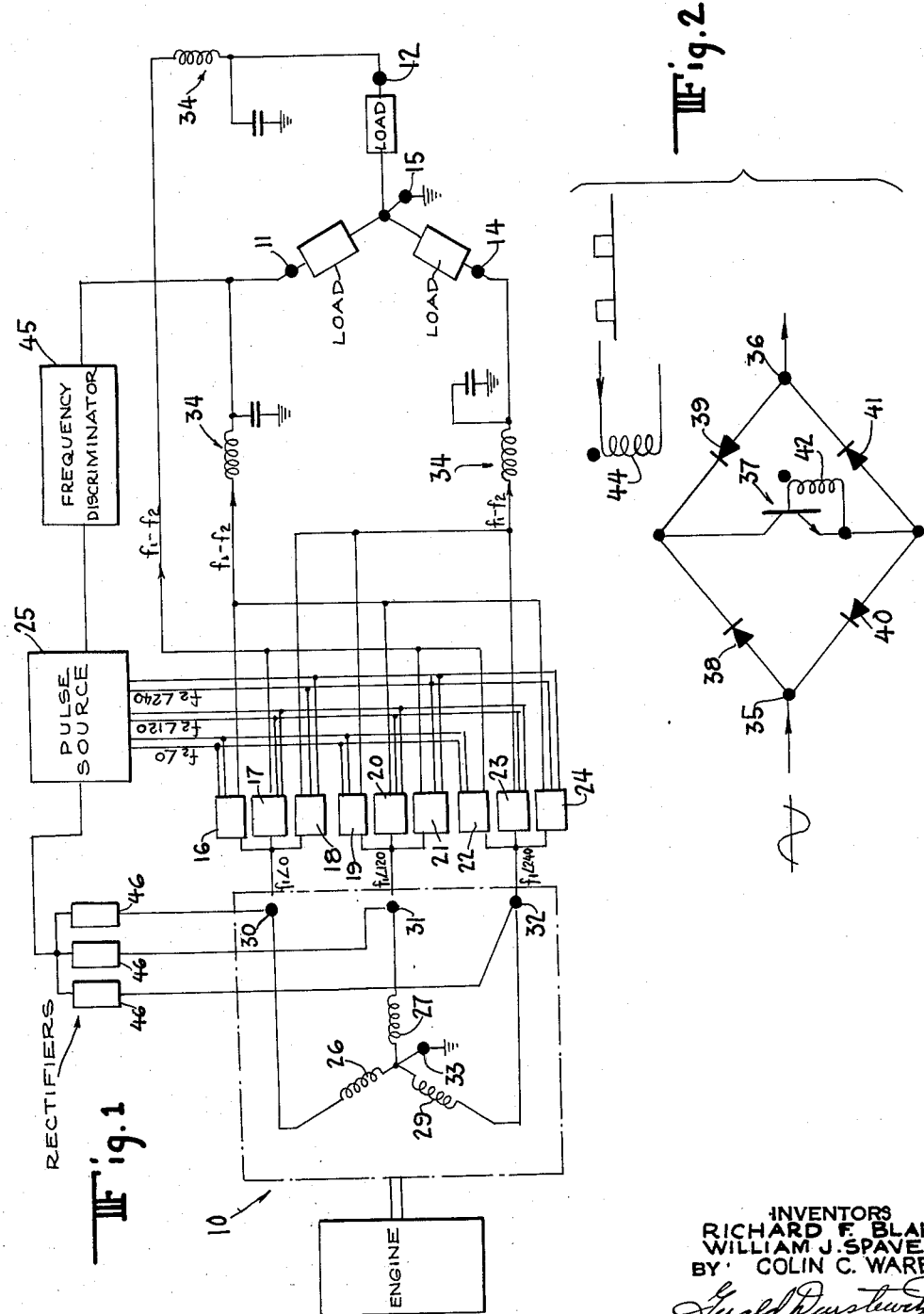
INVENTORS
RICHARD F. BLAKE
WILLIAM J. SPAVEN
BY  COLIN C. WARE
AGENT 3,148,323
**CONTROLLED FREQUENCY POWER
SUPPLY SYSTEM**
Richard F. Blake, Mountain Lakes Borough, William J. Spaven, North Arlington, and Colin C. Ware, Ramsey Borough, N.J., assignors to Specialties Development Corporation, Belleville, N.J., a corporation of New Jersey
Filed July 6, 1959, Ser. No. 825,221
4 Claims. (Cl. 321—61)

The present invention relates to power supply systems, and more particularly, to power supply systems wherein multiple phase power of one frequency is converted into power at a second frequency.

In many applications, there is a need for an efficient, reliable, economical, and light weight power supply which will provide a controlled frequency output, for example, in modern military aircraft, where it is essential that electrical power of constant frequency be supplied to precisely operate electronic equipment. Since it is essential that the weight of the electrical power supply system be kept to a minimum, it is common practice to use, as a source of electrical power, an alternating current generator driven by the aircraft's propulsive engine. The speed of this engine, however, is not constant throughout the various phases of flight (i.e. takeoff, cruise, top speeddash, and letdown). Therefore, if the generator is driven directly from the engine, the speed of rotation of the generator will vary with the engine speed and the output of the generator will vary in frequency.

Since a three phase electrical system requires less copper to transmit a given amount of power than does a system having any other number of phases, it is desirable that the power supply have a three phase output in addition to constant frequency.

One type of device currently used to provide electrical energy at a constant frequency is a constant output speed transmission which is placed between the aircraft's engine and a generator to maintain the speed of rotation of the generator constant. Devices of this type, however, have inherent disadvantages in that they are relatively heavy, complex, and expensive.

Other devices, which have been designed to provide constant frequency electrical power, require additional electrical machinery and therefore are also relatively heavy and expensive.

Accordingly, an object of the present invention is to provide a power supply system in which the output of a multiple phase power source is modified to provide a controlled frequency power output.

Another object is to provide a system for converting multiple phase power at one frequency into power at a different frequency.

A further object is to provide a light weight system to accomplish the foregoing in a simple, practical, and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 1 is a block diagram of a controlled frequency power supply system in accordance with the present invention.

FIG. 2 is a diagram of a portion of the system shown in FIG. 1.

Figure 3:
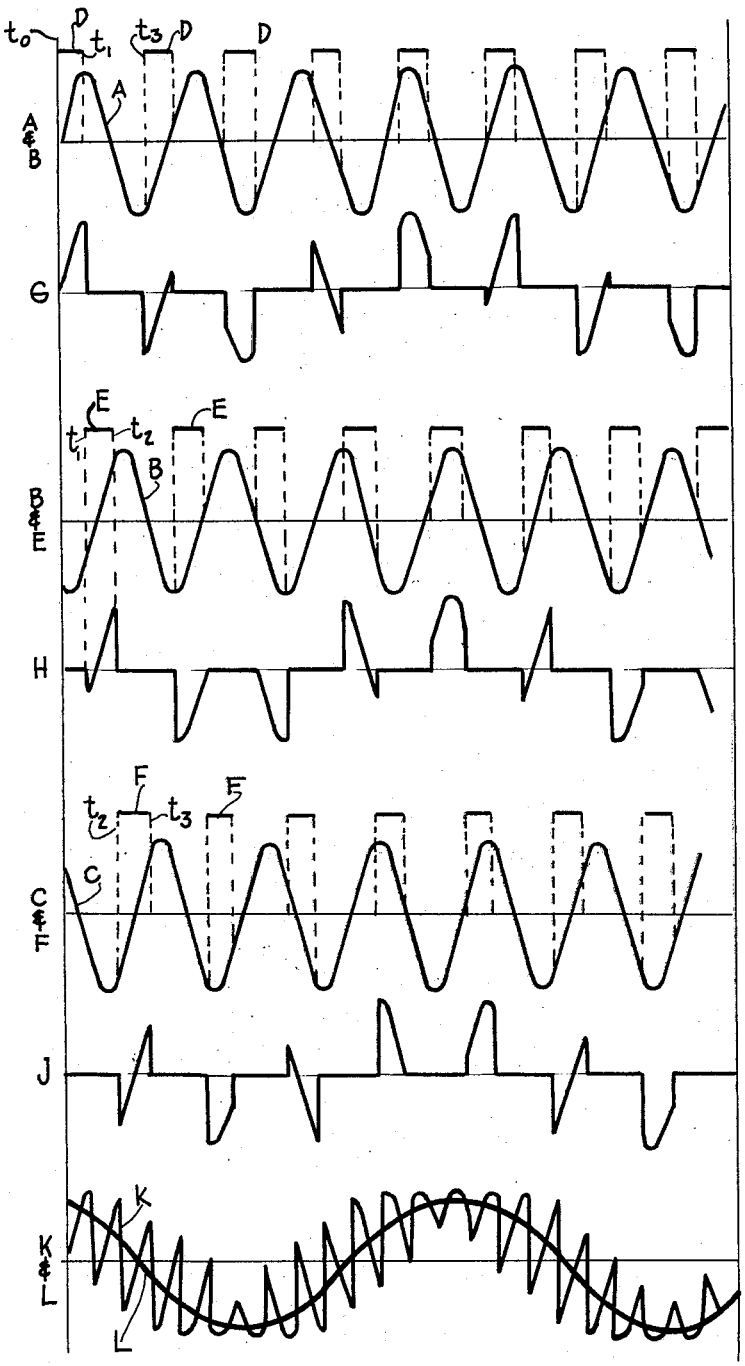
FIG. 3 is a plot of the wave forms present at various points in the system shown in FIG. 1.

Referring to FIG. 1 of the drawings in detail there is shown a system for supplying controlled frequency three phase electrical power in accordance with the present invention which generally comprises a three phase alternator 10 directly driven by a variable speed engine, three individual phase system output terminals 11, 12, and 14 and a common system output terminal 15, nine switch devices 16 to 24 for controlling the flow of electrical energy from the alternator to the system output terminals, and a pulse producing circuit 25 for controlling the operation of the switch devices.

The alternator 10 has three armature windings 26, 27, and 29 electrically displaced 120 degrees from each other to produce three outputs which may be considered to have phase angles of 0, 120 and 240 degrees, three individual phase terminals 30, 31, and 32 respectively connected to one end of the windings 26, 27, and 29, and a grounded common terminal 33 connected to the other end of each of the windings 26, 27 and 29.

The switch devices 16, 20, and 24 are connected between the system output terminal 11 and the alternator terminals 30, 31 and 32 respectively; the switch devices 17, 21 and 22 are connected between the system output terminal 12 and the alternator terminals 30, 31 and 32 respectively; and the switch devices 18, 19 and 23 are connected between the system output terminal 14 and the alternator terminals 30, 31 and 32 respectively. A low pass LC filter 34 is connected between each of the system output terminals 11, 12, and 14 and the switch devices 16, 20 and 24; 17, 21 and 22; and 18, 19 and 23 respectively.

The pulse producing circuit 25 produces three wave trains of pulses which are 120 degrees out of phase with each other and therefore may be considered to have phase angles of 0 degrees, 120 degrees and 240 degrees.

The switch devices 16, 19 and 22 are commonly connected to one of the outputs of the pulse producing circuit 25, the switch devices 17, 20, and 23 are commonly connected to another output of the pulse producing circuit, and the switch devices 18, 21, and 24 are commonly connected to the third output of the pulse producing circuit.

The switch devices 16 to 24 are identical, one of them being shown in FIG. 2 as comprising an input terminal 35 for connection to one of the alternator terminals 30, 31 or 32; an output terminal 36 for connection to one of the system output terminals 11, 12 or 14; a NPN power transistor 37; two diodes 38 and 39 connected between the collector of transistor 37 and the terminals 35 and 36 respectively to conduct current from either of the terminals to the collector; and two diodes 40 and 41 connected between the emitter of the transistor 37 and the terminals 35 and 36 respectively to conduct current from the emitter to either of the terminals. An inductance 42 is connected between the base and the emitter of the transistor 37 and is inductively coupled to an inductance 44 to which one of the outputs of the pulse producing circuit 25 is connected.

The input of a frequency discriminator 45 is connected to the system output terminal 11. The frequency discriminator 45 produces a direct current voltage which is proportional to the output frequency of the system. This direct current voltage is supplied to the pulse producing circuit 45 which also receives direct current power from three rectifiers 46 each of which is connected to one phase output of the alternator 10.

In operation, the alternator 10 has an output frequency $f1$, which varies in accordance with the speed of the driving engine, and the pulse source 25 produces pulses having a repetition frequency $f2$ which is varied by the frequency discriminator 45 to maintain the difference between the frequencies $f1$ and $f2$ constant and equal to the desired output frequency so that the system produces constant frequency output power.

The present invention can be utilized to supply any of various output frequencies by designing the pulse source 25 to produce pulses at a repetition frequency $f2$ which is either greater than or less than the alternator frequency $f1$ by an amount equal to the desired output frequency. For the purpose of explanation, it is assumed that 60 cycle per second power is desired to be delivered to the loads and that the pulse source frequency $f2$ is greater than the alternator frequency $f1$. It is further assumed that the alternator frequency $f1$ at a particular moment is 400 cycles per second. The pulse source is then designed to produce at this moment wave trains of pulses having a repetition frequency of 460 cycles per second.

As shown in FIG. 2, one phase output of the alternator is impressed on the input terminal 35 of each switch device, and one phase output of the pulse source is passed through the inductance 44 of each switch device. When a positive pulse passes through the inductance 44, transistor 37 is placed in conduction and current can flow either from the terminal 35 to the terminal 36, through the transistor 37 and the diodes 38 and 41, or from the terminal 36 to the terminal 35, through the transistor and the diodes 39 and 40. One of the terminals of the alternator is thereby bi-directionally connected to one of the system output terminals 11, 12, or 14 each time a pulse from the pulse source is impressed on one of the switching devices.

To produce the desired output frequency, the switch devices are operated so that each of the output terminals are connected sequentially to the alternator terminals 30, 31 and 32, each such connection being maintained for 120 degrees of one cycle of the pulse repetition frequency $f2$. This is accomplished in the following manner: a pulse of the 0 degree phase output of the source 25 operates the switch devices 16, 19 and 22 to provide a closed circuit between the alternator terminals 30, 31 and 32 and the system output terminals 11, 14 and 12 respectively, for a period of time corresponding to one third or 120 degrees of one cycle of the pulse repetition frequency; a pulse in the 120 degree phase output of the source 25, occurring 120 degrees after the 0 degree output pulse, operates the switch devices 17, 20, and 23 to provide a closed circuit between the alternator terminals 30, 31, and 32 and the system output terminals 12, 11, and 14 respectively for a second 120 degrees of the pulse repetition frequency cycle; and a pulse in the 240 degree phase output of the source 25, occurring 240 degrees after the 0 degree output pulse and 120 degrees after the 120 degree output pulse, operates the switch devices 18, 21, and 24 to provide a closed circuit between the alternator terminals 30, 31, and 32 and the system output terminals 14, 12 and 11 respectively for the final 120 degrees of the pulse repetition frequency cycle.

It may be seen that during the above operation the output terminal 11 is connected in turn to the alternator terminals 30, 31 and 32, the output terminal 12 is connected in turn to the alternator terminals 32, 30, and 31, and the output terminal 14 is connected in turn to the alternator terminals 31, 32, and 30.

To more fully describe the operation of the system, reference is made to FIG. 3 wherein the waveforms involved in producing one phase of the system output are shown. In FIG. 3, the waveforms A, B, and C show the alternator output at the terminals 30, 31, and 32 respectively, the time lines D, E, and F represent the periods of time during which the switch devices 16, 20, and 24 respectively are connecting the alternator terminals 30, 31, and 32 respectively to the output terminal 11, the waveforms G, H, and J show the portions of the waveforms A, B, and C respectively which flow through the switch devices 16, 20, and 24 respectively, the waveform K shows the input to the filter 34, and the waveform L shows the output at the terminal 11.

With reference to the time lines D, E, and F, the period from time $t0$ to time $t3$ represents one cycle of the pulse repetition frequency and the periods from time $t0$ to time $t1$, from time $t1$ to time $t2$, and from time $t2$ to time $t3$ each represent one third or 120 degrees of the pulse repetition cycle.

During the time interval $t0$ to $t3$, the switch device 16 is closed only from time $t0$ to time $t1$ allowing current to flow between the terminal 30 and the terminal 11 in the manner shown by waveform G, the switch device 20 is closed only from time $t1$ to time $t2$ allowing current to flow between the terminal 31 and the terminal 11 in the manner shown by waveform H, and the switch device 24 is closed only from time $t2$ to time $t3$ allowing current to flow between the terminal 32 and the terminal 11 in the manner shown by waveform J.

The output terminals of switch devices 16, 20 and 24 are connected together, therefore, the input to the filter 34 includes all of the portions of the waveforms G, H and J arranged in the order in which they appear, as shown in waveform K.

From inspection of the waveform K it may be seen that the input to the filter 33 includes a low frequency component and high frequency components. The frequency of the low frequency component is equal to the difference between the alternator frequency $f1$ and the pulse repetition frequency $f2$, and the frequency of the largest amplitude (and lowest frequency) high frequency component is equal to twice the pulse repetition frequency $f2$ plus the alternator frequency $f1$. This high frequency component, is approximately equal to three times the switching frequency $f2$ and therefore is approximately equal to the switching frequency $f2$ times the number of switching phases. The high frequency components of the waveform K are removed by the filter 34 thus producing a smooth low frequency output at the terminal 11, as shown by the waveform L.

If, as previously assumed, the frequency of the alternator outputs is 400 cycles per second and the repetition frequency of the pulses produced by the source 25 is 460 cycles per second, then the low frequency components of the waveform K (and the frequency of the waveform L) is 60 cycles per second and the high frequency component of the waveform K is 1320 cycles per second.

By repeating the above graphic analysis for switch devices 17, 21, and 22 and 18, 19, and 23 it will be seen that the waveforms at the system output terminals 12 and 14 are identical to the waveform L but are displaced in phase 120 degrees with respect to each other and with respect to the waveform L.

As the speed of the driving engine varies, the frequency of the alternator outputs vary tending to cause similar variations in the system output frequency. The frequency discriminator 45 samples the system output frequency and continually adjusts the repetition frequency of the pulses produced by the source 25 so that it is always 60 cycles per second above the alternator frequency and the output frequency is maintained at a constant value.

To accomplish this function, the frequency discriminator 45 may, for example, include an amplitude limiter connected to the output terminal 11, an "m" derived filter connected to the output of the amplitude limiter, a full wave rectifier connected to the output of the "m" derived filter, and a smoothing filter connected to the output of the full wave rectifier. The "m" derived filter has an output voltage which is proportional to the input frequency, and, therefore the smoothing filter produces a D.C. voltage which is proportional to the frequency at the input of the "m" derived filter, and is applied to the pulse source 25 to vary the repetition frequency of its pulse output.

The pulse source 25 may include a multivibrator producing a square wave having a frequency of $3f2$; a differentiating circuit connected to the output of the multivibrator to produce positive and negative going spiked pulses in response to the leading and trailing edges of the square wave; and a ring of three counter connected to the output of the differentiating circuit and having three outputs which are the outputs of the source 25. The ring of three counter produces rectangular pulse in one of its outputs during the time interval from the first to the second spiked positive input pulse, a similar pulse in a second of its outputs between the second and third spiked positive input pulse, a similar pulse in the third of its outputs between the third and fourth positive spiked input pulses, etc. The outputs of the source 25 therefore each contain rectangular pulses which have a repetition frequency $f2$, have a duration of 120 degrees, and are 120 degrees out of phase with each other.

The D.C. voltage from the frequency discriminator 45 is applied as bias to the multivibrator. Since the frequency of a multivibrator is dependent upon bias voltage, the frequency of the square wave generated by the multivibrator will vary as the input frequency of the frequency discriminator 45 varies, thus varying the repetition frequency $f2$ of pulses in each of the outputs of the source 25. If the frequency discriminator 45 is designed such that a small change in its input frequency produces a large change in the frequency of the pulse source outputs, then the alternator frequency may vary widely with only a slight variation in the frequency of the outputs of the system.

To provide direct current power for the pulse source, a portion of each of the alternator outputs is rectified in the rectifiers 46 which preferably are of the full wave type, and the outputs of the rectifiers, which are out of phase, are connected in parallel to provide a relatively smooth direct current voltage.

While the system described herein converts the outputs of a three phase alternator having one frequency into three phase power at a second frequency, it is to be understood that the principles of the present invention may be used to convert the outputs of an alternator having any number of phases into power at a different frequency by providing, for each system output desired, a switch device connected to each phase output of the alternator, and by operating the switch devices so that each of the alternator phase outputs are alternately connected to the system output at a rate such that each of the alternator outputs is connected to the system output with a frequency which differs from the frequency of the alternating current power by an amount equal to the desired system output frequency.

Since the high frequency component of the unfiltered system output is approximately equal to the pulse repetition frequency $f2$ times the number of switching phases it will be understood that by utilizing an alternator and the switching device which have a greater number of phases the frequency of this undesirable high frequency component will be increased thus reducing the necessity for filtering the system output.

It is also to be understood that although the switch devices described herein are of the type which remain closed only throughout the duration of a switching pulse and although the pulse source described herein is of the type which produces a rectangular pulse having a duration equal to the desired closed switch time, the present invention is not limited thereto but rather contemplates the use of any switch device and pulse source which act together to maintain a closed circuit for the required period of time.

From the foregoing description, it will be seen that the present invention provides a lightweight power supply system in which the output of a multiple phase power source is modified in frequency in a simple, practical, and economical manner to provide a controlled frequency power supply output.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:
1. A system for supplying constant frequency polyphase power to a plural phase power load from a polyphase A.C. power source of variable frequency including a group of switch devices in each of the power phase lines for directly connecting the power phases to the load phases, each of said groups containing a number of switches each directly connected to a different one of the load phases, a pulse source powered by said power source for operating said switches having a plurality of outputs and producing at each output a train of pulses having a recurrence frequency which differs from the power source frequency by an amount equal to the desired constant frequency, each of said pulse outputs being connected to one switch in each of said groups to close the switch in response to a pulse and allow that portion of the waveform then occurring to flow to a load phase for the duration of the pulse, the switches connected to the same load phase being connected to different pulse outputs, the pulses at the different pulse outputs being displaced in phase by an amount such that the switches connected to the same load phase are operated to sequentially connect each power phase to the load phase to produce at each load phase a series of waveform portions having as a component thereof the desired constant frequency, and frequency discriminating means connected between one of the load phases and the pulse source to vary the pulse recurrence frequency to maintain the desired constant frequency at the load.

2. Apparatus according to claim 1, wherein each of said groups of switches contains a number of switches equal to the number of load phases.

3. Apparatus according to claim 1, wherein said pulses have a duration such that only one of the power phases is connected to each load phase at any time.

4. Apparatus according to claim 3, wherein said pulses have a substantially rectangular waveform.

References Cited in the file of this patent

UNITED STATES PATENTS

| | | |
|---|---|---|
| 1,934,230 | Jonas | Nov. 7, 1933 |
| 2,181,152 | Rolf | Nov. 28, 1939 |
| 2,298,130 | Janetschke | Oct. 6, 1942 |
| 2,415,708 | Sciaky | Feb. 11, 1947 |
| 2,549,831 | Longini | Apr. 24, 1951 |
| 2,707,258 | Boyer et al. | Apr. 26, 1955 |
| 2,899,566 | Ware | Aug. 11, 1959 |
| 2,967,252 | Blake | Jan. 3, 1961 |
| 2,995,696 | Stratton et al. | Aug. 8, 1961 |

FOREIGN PATENTS

| | | |
|---|---|---|
| 685,970 | Germany | Dec. 30, 1939 |